Jan. 3, 1928.
R. MURN
1,655,103
HEADLIGHT
Filed March 1, 1927
3 Sheets-Sheet 1
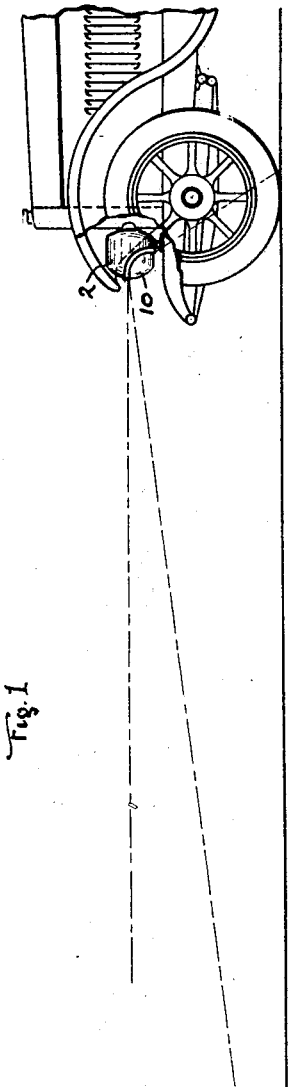
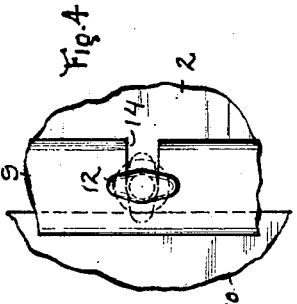
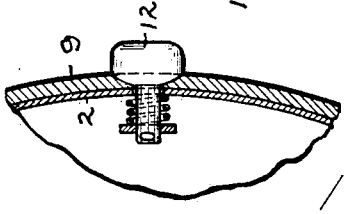
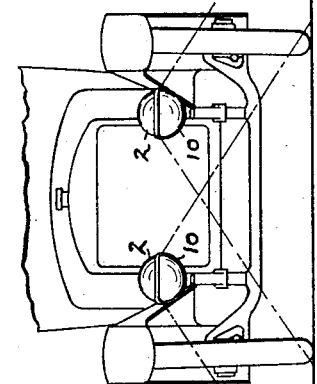
INVENTOR
Rudolph Murn
BY
ATTORNEY

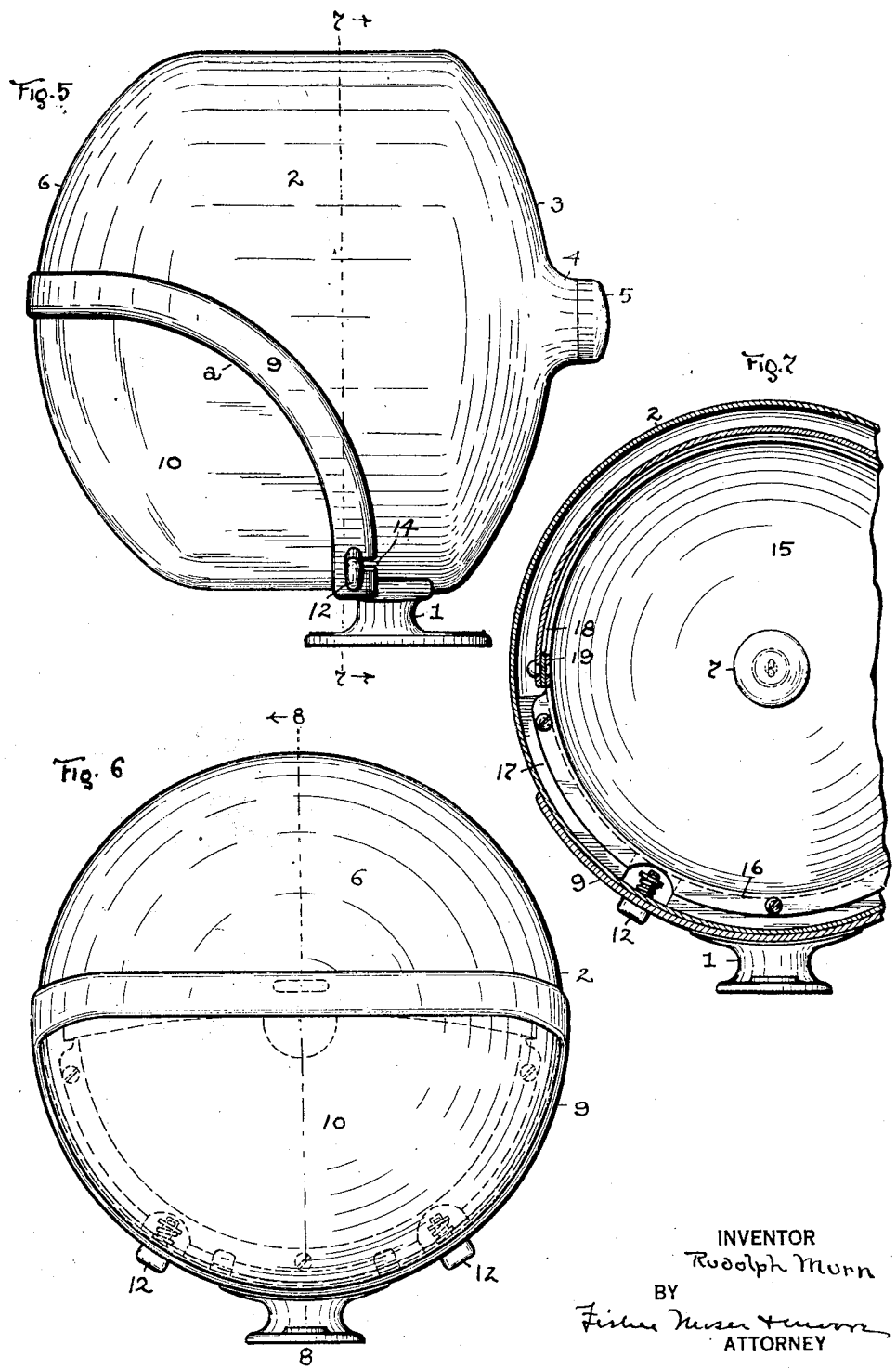

Jan. 3, 1928.　　　　　　　　　　　　　　　　　　1,655,103
R. MURN
HEADLIGHT
Filed March 1, 1927　　　　3 Sheets-Sheet 3
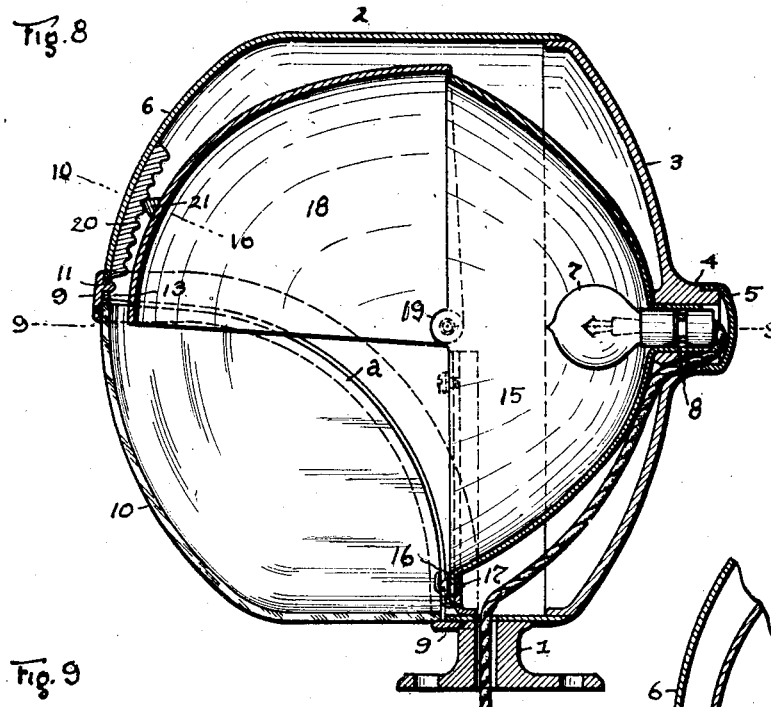
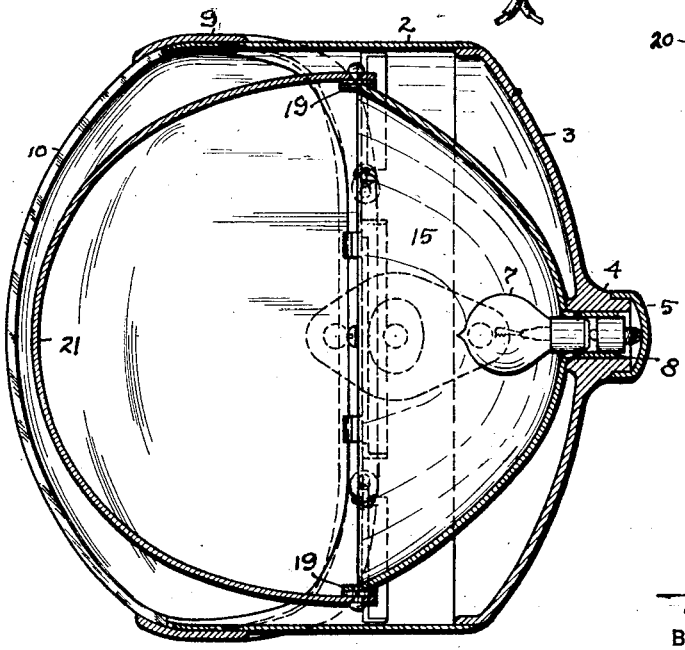
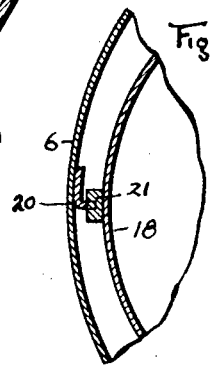
INVENTOR
Rudolph Murn
BY
ATTORNEY Patented Jan. 3, 1928.

1,655,103

UNITED STATES PATENT OFFICE.

RUDOLPH MURN, OF LAKEWOOD, OHIO.

HEADLIGHT.

Application filed March 1, 1927. Serial No. 171,781.

My invention relates to an improvement in automobile headlights, and my object in general is to provide a head light which will project and diffuse the light forwardly a substantial distance without objectionable glare and also laterally and rearwardly with spreading effect to brightly illuminate the sides of the road and underneath the front end and steering wheels of the vehicle all substantially as herein shown and described and more particularly pointed out in the claims.

Fig. 1 is a side elevation of the front portion of an automobile embodying a lamp of my construction, and Fig. 2 is a front view thereof, both figures showing in dotted lines the general field of illumination obtained by such headlights. Fig. 3 is a sectional view, and Fig. 4 a side elevation of a detail involving the lock for fastening the glass lens within the front of the lamp body. Fig. 5 is a side view, and Fig. 6, a front view of the lamp, while Fig. 7 is a sectional view vertically of the lamp on line 6—6 of Figs. 5 and 8. Fig. 8 is a sectional view vertically of the lamp on line 8—8 of Fig. 6. Fig. 9 is a horizontal section on line 9—9 of Fig. 7, and Fig. 10 is a sectional view of the locking parts for the pivoted reflector, on line 10—10 of Fig. 8.

The invention comprises a hollow lamp body or shell 2 having its rear end entirely closed by a dished member or wall 3 which embodies at its center a tubular hub 4 covered by a cap 5. Body 2 is in part a straight cylinder and in part of dome shape, the upper front half thereof being closed by a rounded wall or semi-circular dome 6, while the lower half of the front part of the lamp body is open over its entire area, including a sector of the straight sides and bottom of body or shell 2. The light from the electric bulb 7 which is secured in the electrical socket 8 within hub 4, is projected downwardly in the main through this front and bottom opening, and the front upper half 6 serves as a screen for the light rays above the longitudinal axis of the lamp. The upper border edge of opening $a$ may extend on a straight line across the front of the lamp body and thence curve downwardly and rearwardly at each side to bring the opening well toward the rear of the body, which narrows the lower half of the body but still leaves sufficient stock thereat to permit a supporting standard or mounting 1 to be rigidly secured thereto, see Fig. 7.

The border edge of opening $a$ is overlapped by a flanged slip ring 9 having the same irregular circular shape as the opening, and a glass lens 10 is removably mounted within and confined in place upon body 2 by said ring, said lens preferably being of partly cylindrical and partly dome shape in conformity with the front upper half of body 2. The front upper edge of lens 10 projects upwardly behind the depending flange of the front and higher part of ring 9, and the lower end edge of the lens rests upon the horizontally extending portions of the ring at the bottom of the body, see Fig. 7, thus holding the lens within the ring, which in turn is removably locked to body 2 by an inwardly extending lug 11 which fits a slot 13 in the upper front half of the body, and by one or more rotatable spring-pressed locking buttons or finger pieces 12 extending through open-ended slots 14 in the ring, see Figs. 3 and 5.

The present lamp embodies a parabolic reflector 15 into which the electric light bulb 7 extends, and the bottom front edge 16 of this reflector is flanged and screwed to an angle piece 17 to support it rigidly within the body or shell, and which support is desired because a second reflector 18 of irregular curvature or a quarter section of an ovoidal sphere, is pivotally secured to ears or projections 19 on opposite sides of the main parabolic reflector. The reflector pivots lie in the same horizontal plane as the axis of the lamp body and electric light bulb, and a part of the light rays which are reflected forwardly by the main reflector are deflected at divers angles rearwardly and downwardly as well as laterally through the light opening $a$ enclosed by the glass cover or lens 10. The upper half of the beam of light from the main reflector is therefore not merely screened by the upper closed front half of body 2 but it is utilized to provide a flood light immediately beneath and at each side of the lamp body, part of the light being also projected rearwardly beneath the lamp body to illuminate the steering wheels. The field so illuminated may be varied in extent and the light beam modified by tilting the secondary reflector 18 on its pivots. To permit such adjustment and to lock the reflector when adjusted, I provide a segmental rack 20 fixed to the inner side of dome part 6 of shell or body 2, which is made of sheet metal having spring properties, and which rack is thereby adapted to be held in releasable spring locking engagement with a rib or bead 21 on reflector 18, see Fig. 7. Such adjustments are made when the lens 10 and its locking ring 9 are removed, and the interior of lamp body 2 is made accessible.

What I claim, is:

1. A headlight, comprising a cylindrical body having its upper front half closed and its lower front half and part of its bottom open, a transparent lens covering said opening, a main reflector having a source of light at its center within the rear end of said body, a second reflector pivotally mounted at the front of said first reflector, and means within said body adapted to fix said second reflector in various tilted positions relatively to said first reflector.

2. A headlight, comprising a shell having a main reflector within its rear portion and formed with a flexible dome-shaped closure portion at its front, a second reflector pivotally connected to said main reflector, and coacting means on said second reflector and flexible front piece adapted to lock said reflector adjustably on its pivots.

3. A headlight, comprising a cylindrical shell having its front upper half closed and formed with an opening in its lower half extending part length of the bottom of said shell, a lens and locking ring therefor removably secured to said shell and covering said opening, a main reflector within the rear end of said shell, a reflector segment pivotally mounted within said shell above said opening, and a source of light axially of said shell and main reflector.

4. A headlight, comprising a cylindrical body having a dome-shaped front in its upper half and a light opening in its lower front half and bottom, a lens which is partly cylindrical and partly dome-shaped to conform with the closed front end of said body, a clamping ring having a vertical overlapping flange for the front edge of said lens and a horizontal rest flange for the rear bottom edge thereof, means adapted to lock said ring to said body, a main reflector within the rear end of said body, and a secondary reflector within the front upper half of said body above said lens and opening.

5. A headlight, comprising a cylindrical shell having a rounded rear and front end, the lower half of the front end and the front part of the cylindrical bottom of said shell having an opening therein, a lens for said opening, a clamping ring for the lens, a main reflector within the rear end of said shell, a lighting element at the center of said reflector, means adapted to secure the front edge of said reflector rigidly to said shell, a second reflector of segmental form pivotally connected to said main reflector and tiltable within the upper front end of said shell above said light opening, and means adapted to lock said second reflector releasably to said shell.

6. A headlight, comprising a cylindrical shell having a dished rear member, a main reflector secured centrally within said rear member, a lamp socket and electric light bulb centrally of said reflector, means adapted to secure the front edge of said main reflector rigidly to said shell, said shell being open at its bottom in front of said reflector and extending forwardly above said opening and closed at its front above its longitudinal axis, a lens covering said opening in the shell, an irregularly curved reflector segment pivotally mounted within the closed upper front part of said shell, and means adapted to lock said reflector segment in different tilted positions above said opening.

In testimony whereof I affix my signature.

RUDOLPH MURN.